Feb. 23, 1926.  
G. MIDBOE  
1,574,047  
DRIVE FOR MOTOR VEHICLES  
Filed Feb. 29, 1924  
2 Sheets-Sheet 1
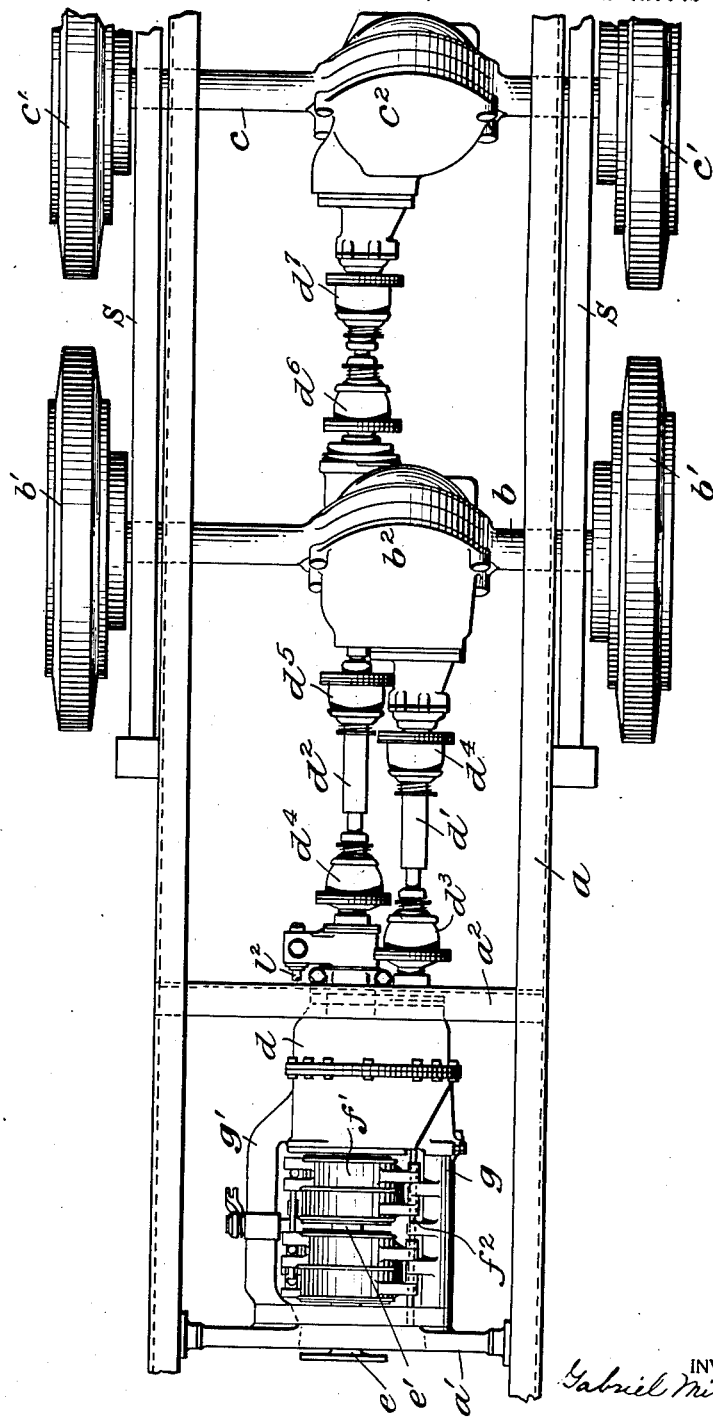

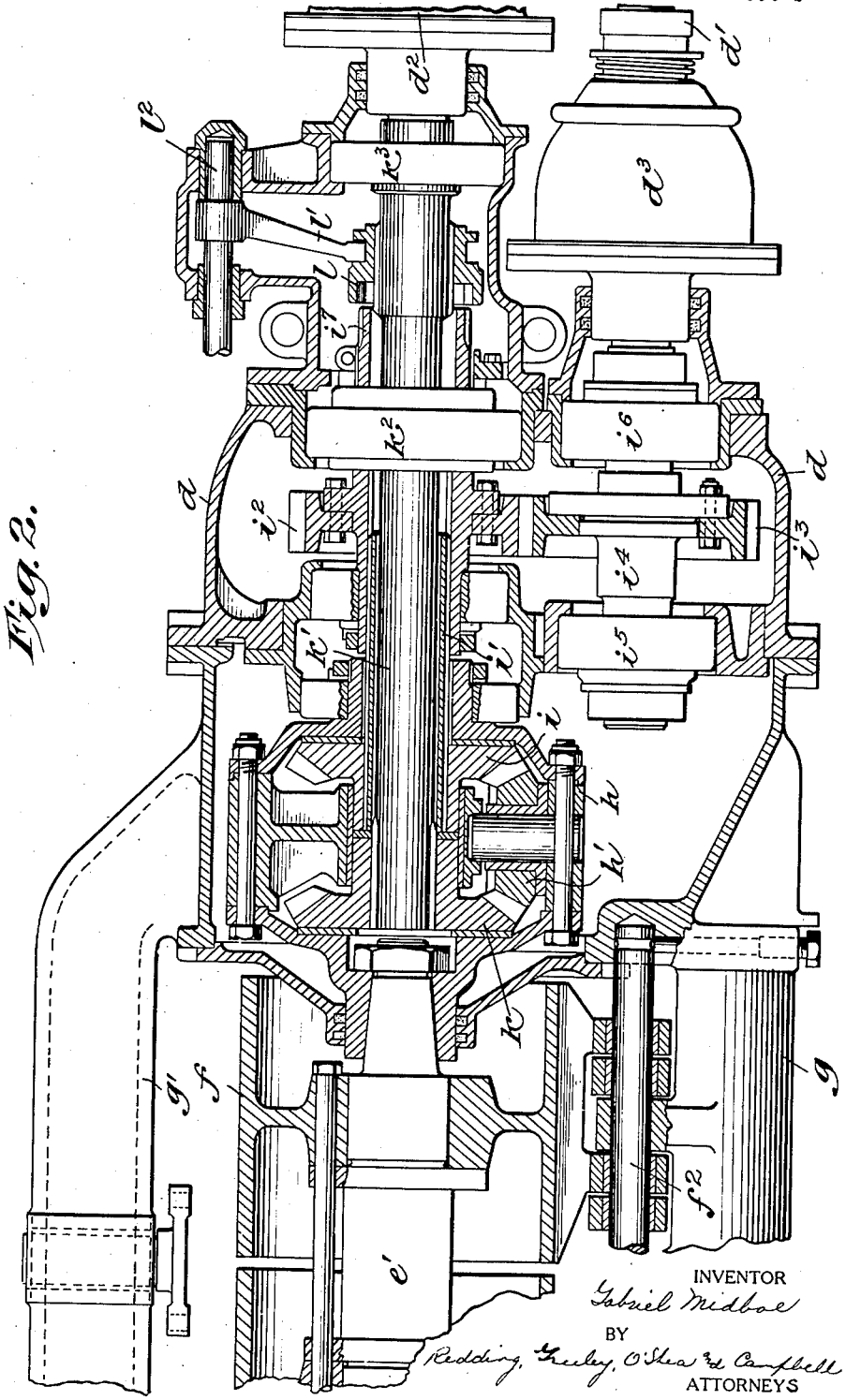

Patented Feb. 23, 1926.

1,574,047

UNITED STATES PATENT OFFICE.

GABRIEL MIDBOE, OF BROOKLYN, NEW YORK, ASSIGNOR TO INTERNATIONAL MOTOR COMPANY, OF NEW YORK, N. Y., A CORPORATION OF DELAWARE.

DRIVE FOR MOTOR VEHICLES.

Application filed February 29, 1924. Serial No. 695,891.

*To all whom it may concern:*

Be it known that I, GABRIEL MIDBOE, a citizen of the United States, residing in the borough of Brooklyn, of the city of New York, in the State of New York, have invented certain new and useful Improvements in Drives for Motor Vehicles, of which the following is a specification, reference being had to the accompanying drawings, forming a part hereof.

This invention relates to improvements in drives for motor vehicles and particularly to vehicles in which a plurality of driving axles are employed. In such types of drives a differential gear is mounted on each axle between the live axle shafts thereof and an additional differential is interposed operatively between the differential gears on two of the axles. For convenience in this description the improvements are illustrated as incorporated in a dual rear axle drive in which only two driving axles are provided and the third differential is interposed operatively between the differentials on such two driving axles. The reason for the third differential is well understood in that differential movement as between the two differential gears on the jack shafts is desirable to afford the compensation for variable tractive effort exerted by the respective drives, such dual rear axle drives have had the disadvantage of the substantial amount of unsprung weight added to one or both of the axles by the inclusion of the third differential. It is the principal object of the present inventoin to so improve dual rear axle drives of the type indicated that the third differential may be sprung on the chassis of the vehicle. The improved construction is simple and efficient and the parts are accessible.

Still another object of the present invention is to provide an improved differential unit having associated therewith brakes to the end that the entire unit may be mounted and demounted in one operation.

Still another object is to incorporate with the improved differential unit simple and easily manipulable devices which are also located on the chassis for coupling the propeller shafts for the respective differential gears on the axles thereby bringing about a non-differential drive as between the two axles when occasion requires.

These and other objects will appear at greater length in connection with the detailed description of the preferred embodiment of the invention, in which:

Figure 1 is a view in plan of a fragment of a chassis having a dual rear axle drive and in which the third differential is sprung on the chassis in accordance with the invention.

Figure 2 is a fragmentary detailed view in horizontal section taken through the housing of the third differential to show the hook-up of the brakes with the differential, the division of power as between the two propeller shafts for the rear axles and the device for bringing about selectively a non-differential drive.

As indicated before the improvements are not to be limited in their application to the vehicles in which only two driving axles are employed but since they will find their most general application thereto such a type drive has been illustrated. Further, the invention is not limited to the details of construction of the driving mechanism for each of the axles. There has been shown a chassis $a$ supported on rear axle tubes $b$, $c$, and driving wheels $b'$, $c'$, respectively. Springs to support the chassis on the axles are indicated conventionally at S. Each of the wheels of a pair will be driven in conventional manner by jack shafts coupled by a differential gear mounted on each of the axles, the housings $b^2$ and $c^2$, on the respective axles $b$, $c$, enclosing these differential gears and none of the details of such gears or the jack shafts being illustrated since the invention is not concerned therewith. In order that the pairs of jack shafts within the respective axles $b$ and $c$ may be afforded differential movement with respect to one another it is necessary in such drives to interpose operatively a third differential between the differentials within the housings $b^2$, $c^2$. The provision of such a third differential, however, ordinarily means a substantial increase in unsprung weight since such a differential has heretofore been carried on one or the other of the axles $b$, $c$. The principal object of the present invention is to interpose a differential operatively between the differentials enclosed within the casings $b^2$, $c^2$, and yet spring the weight of such third differential on the chassis $a$. In realizing this object of the invention a sectional housing $d$ for the third differential is shown as mounted on cross-beams $a'$, $a^2$, of the chassis and as having connected operatively therewith in a manner which will be described, rearwardly extending propeller shafts $d'$, $d^2$ which lead to the differentials in the respective housings $b^2$, $c^2$. In the propeller shaft $d'$ are imposed operatively as between the differential in the housing $d$ and in the housing $b^2$, two universal joints illustrated conventionally at $d^3$, $d^4$, to afford free relative movement between the differentials within the housings $d$, $b^2$, but without interfering with the transmission of power. Similarly, the propeller shaft $d^2$, has included therein universal joints $d^4$ and $d^5$ between the housing $d$ and the housing $b^2$ and its continuation beyond the housing $b^2$ has included therein additional universal joints $d^6$, $d^7$, to facilitate relative movement between the axles $b$, $c$, without interfering with the transmission of power.

Power from the propelling motor may be delivered through a propeller shaft coupled to the shaft $e$. This shaft carries thereon brake drums $f$ with which co-operate brake bands $f'$ hinged at $f^2$ on one arm of a yoke $g$ carried with the differential casing $d$ the other leg $g'$ of the yoke being disposed at the opposite side of the brake bands $f'$ and the two arms being supported on the cross-beams $a'$ of the chassis. The rear end of the casing $d$ is mounted directly in the cross frame $a^2$. The shaft $e'$ just beyond the brake drums $f$ is keyed to a differential housing $h$ carrying spur pinions $h'$ enmeshed with bevel gears $i$, $k$. The bevel gear $k$ is keyed on a shaft section $k'$ through which power is delivered rearwardly to the propeller shaft $d^2$ and thence to the differential within the housing $c^2$ on the axle $c$. Suitable bearings $k^2$, $k^3$, support the said shaft section $k'$ in the casing $d$. The other bevel gear $i$ is keyed onto a sleeve $i'$ through which the shaft section $k'$ extends loosely. The hollow shaft $i'$ has keyed thereon a spur gear $i^2$ which meshes with a second spur gear $i^3$ carried with a short shaft section $i^4$ journaled in the casing $d$ by bearings $i^5$, $i^6$, and extending rearwardly for connection through the universal joint $d^3$ with the propeller shaft $d'$. By the construction described it will be evident that differential movement is afforded as between the pairs of jack shafts in the respective axles $b$, $c$.

If desired, this differential action may be selectively eliminated and the shaft sections $k'$, $i^4$, coupled for non-differential movement by means of a clutch element $l$ feathered on the shaft section $k'$ and slidable into engagement with extended hub $i^7$ of the spur gear $i^2$. A shifter fork $l'$ and shifter rod $l^2$ may be employed in accordance with accepted practice to operate the clutch $l$ when the shaft section $k'$ is to be connected operatively with the gear $i^2$ in the manner described. When so coupled there can be no differential movement between the two parts.

The entire construction as described is rugged, simple, accessible and compact and provides for the minimum amount of unsprung weight. Changes in the structural details of the parts may be made without departing from the spirit of the invention so long as the stated objects are realized by means which are mounted as described.

What I claim is:

1. In a dual rear axle drive, a differential mounted upon the chassis, differentials mounted upon the respective rear axles, propeller shafts between the respective rear and the first mentioned differentials, means in the forward rear differential housing providing a journal for the rear propeller shaft and means in the respective propeller shafts for permitting relative movement between the respective differentials.

2. In a differential housing and a propeller shaft therefor, a yoke mounted upon the housing and extending in the plane of the propeller shaft, the bight of the yoke bearing the shaft, brake drums mounted upon the shaft and within the yoke, brake shoes pivoted upon one leg of the yoke and means for supporting the housing and yoke upon the chassis whereby the same forms a unitary structure.

3. In a transmission for vehicles including a propeller shaft and two driving shafts with power apportioning means between, a yoke-shaped housing mounted in a plane with the propeller shaft and between two transverse supporting members of the vehicle chassis, the propeller shaft extending within the yoke, braking means upon the propeller shaft between the legs of the yoke and cooperating means upon the yoke, the housing at the bight of the yoke forming an enlarged portion for enclosing the power apportioning means and the associated mechanism between the two shafts.

4. In a transmission for vehicles including a propeller shaft and two driving shafts with power apportioning means between, a yoke-shaped housing mounted in a plane with the propeller shaft and between two transverse supporting members of the vehicle chassis, the propeller shaft being journaled in the bight of the yoke, brake drums mounted upon the propeller shaft within the yoke, brake shoes pivoted upon the yoke, means for operating the brake shoes, the housing at the bight of the yoke forming an enlarged portion for enclosing the power apportioning means and the associated mechanism between the two shafts.

5. A housing for a differential mounted between two transverse supporting members of the vehicle, a propeller shaft journaled in the housing and driving the differential casing, bevel gears driving concentrically mounted shafts from the differential casing, a counter shaft within the casing and means driving the counter shaft from the outer one of the concentric shafts, a bearing for the stub end of the outer shaft and clutch means mounted on the bearing and engaging the stub end of the outer shaft and the inner shaft to lock the differential.

This specification signed this 25th day of February A. D., 1924.

GABRIEL MIDBOE.